United States Patent Office 3,047,271
Patented July 31, 1962

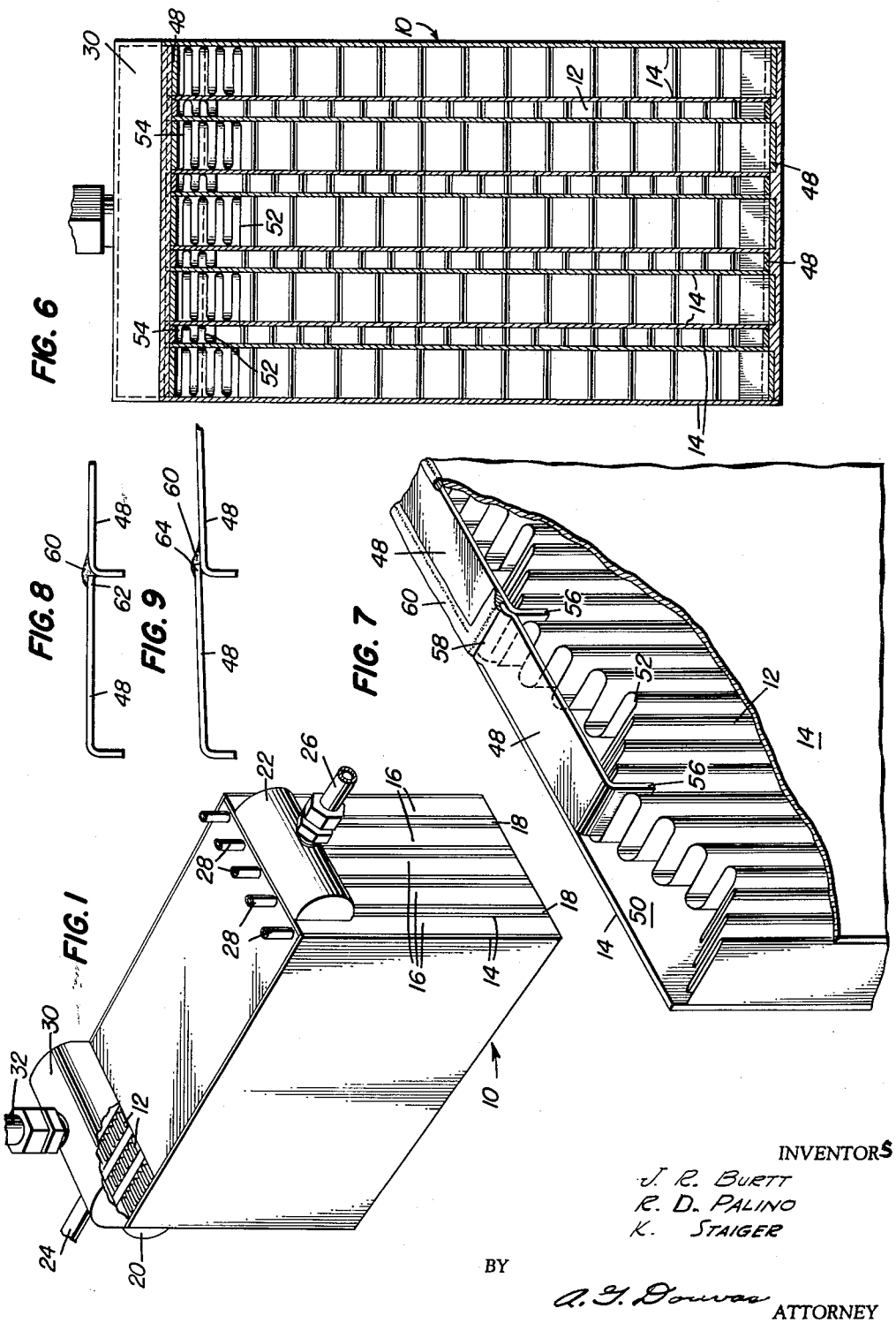
July 31, 1962 J. R. BURTT ET AL 3,047,271
BRAZED PLATE AND RUFFLED FIN HEAT EXCHANGER
Filed Aug. 7, 1958 4 Sheets-Sheet 1
INVENTORS
J. R. BURTT
R. D. PALINO
K. STAIGER
BY
ATTORNEY

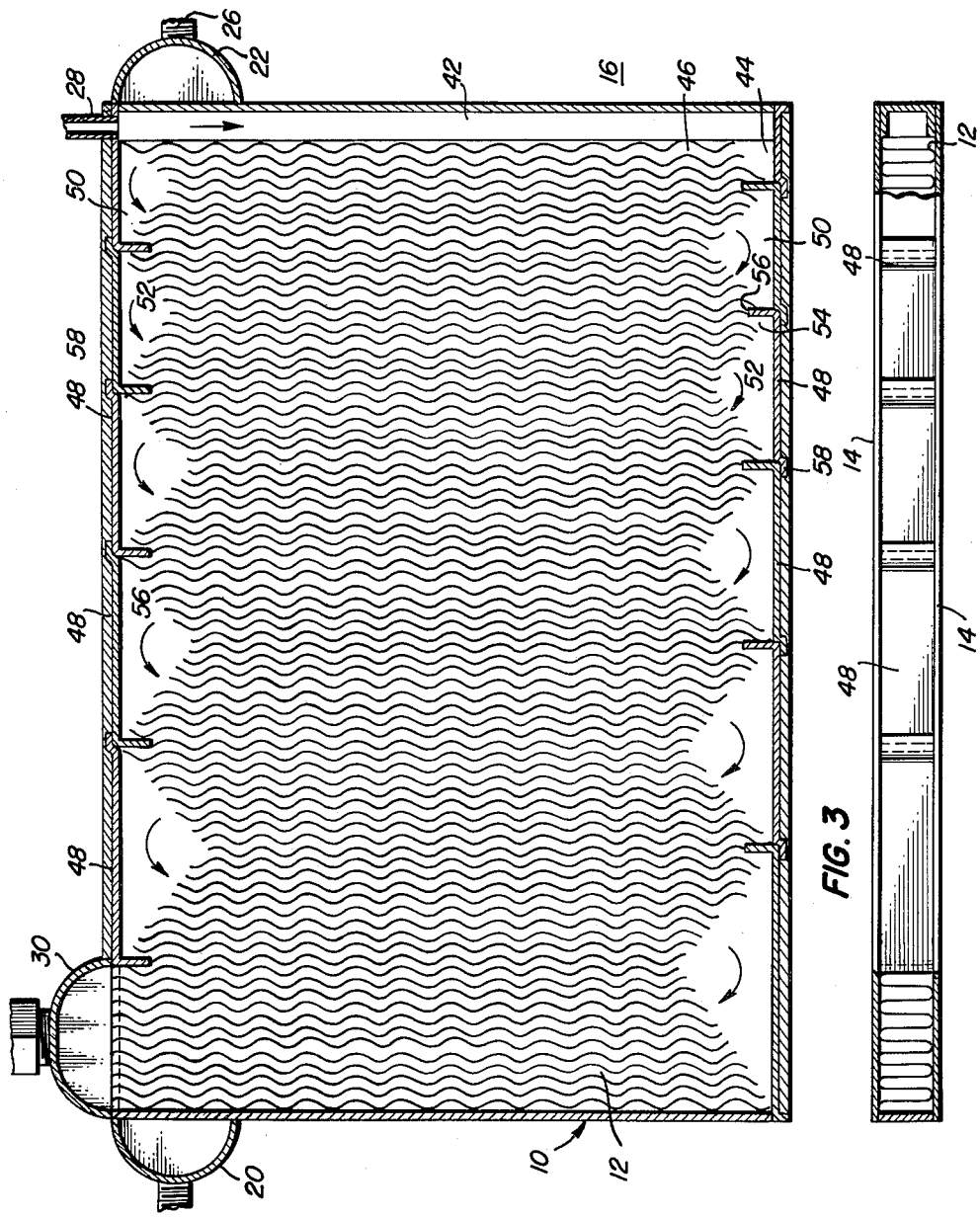

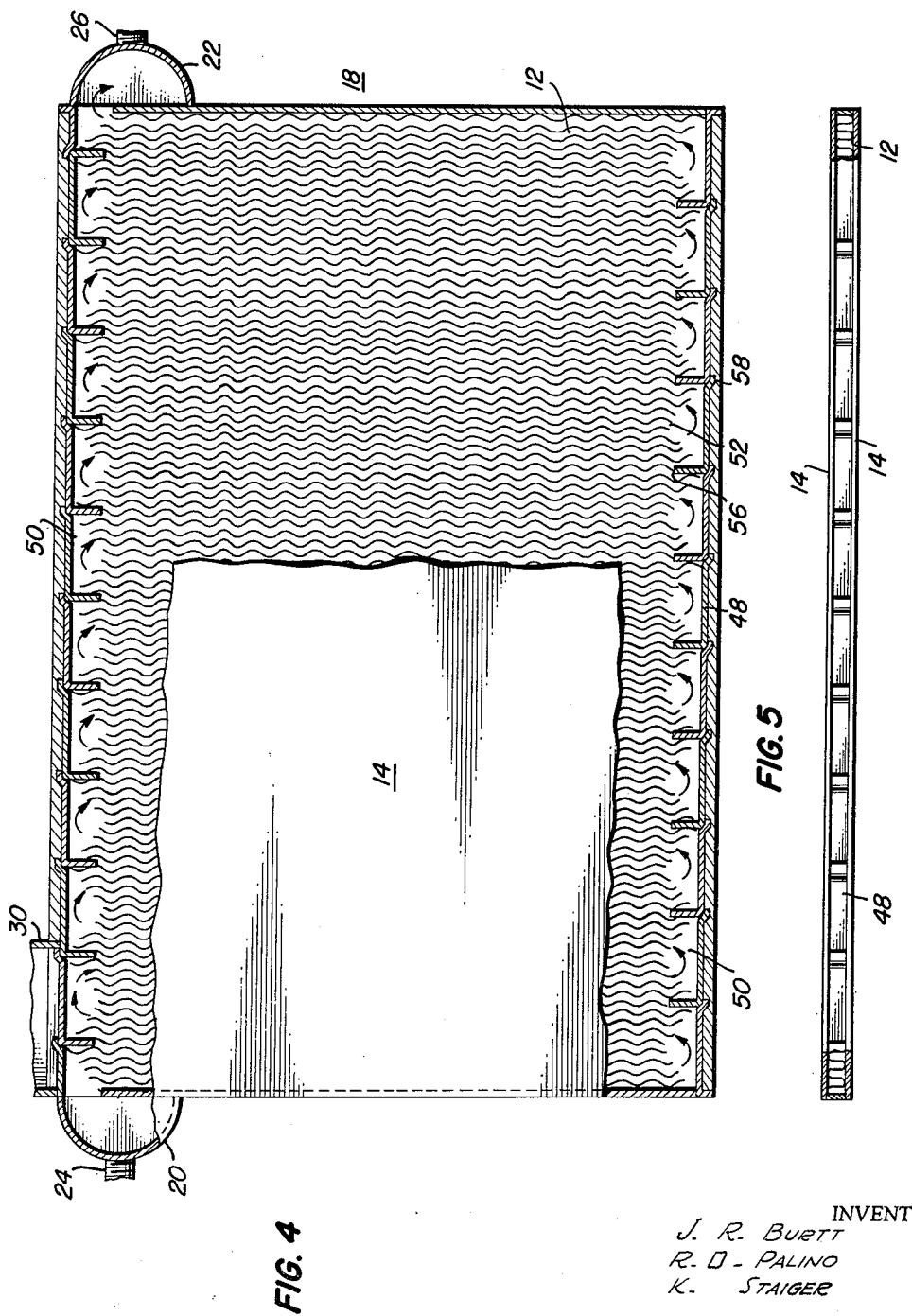

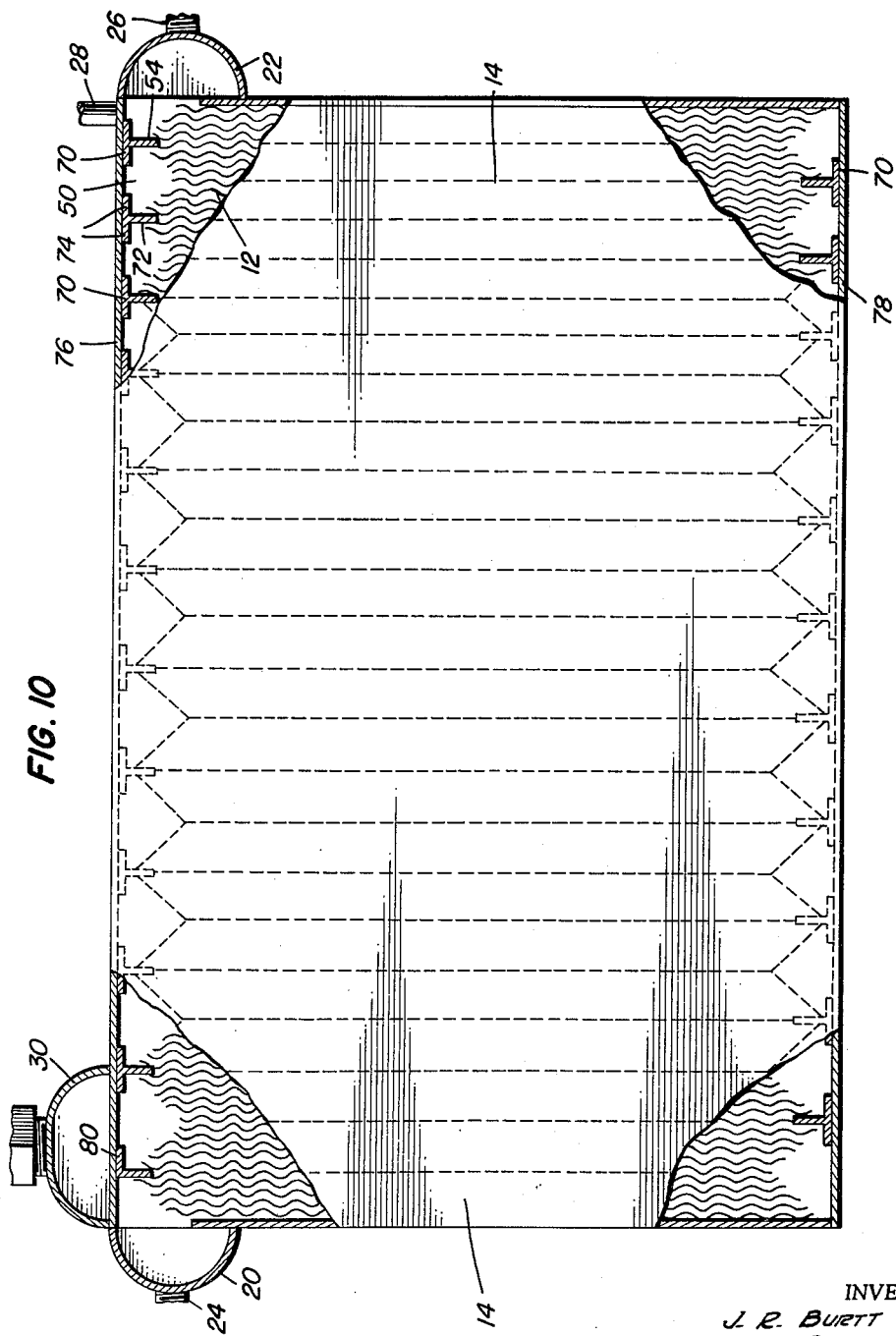

3,047,271
BRAZED PLATE AND RUFFLED FIN
HEAT EXCHANGER
Jack R. Burtt, Raymond D. Palino, and Kurt Staiger, Indianapolis, Ind., assignors to Stewart-Warner Corporation, Chicago, Ill., a corporation of Virginia
Filed Aug. 7, 1958, Ser. No. 753,746
6 Claims. (Cl. 257—245)

This invention relates to a brazed plate and ruffled fin type heat exchanger and more particularly to such a heat exchanger wherein the ruffled fin is formed of a single sheet of metal extending completely through the heat exchanger, and to improved means for providing a plurality of channels within the single continuous ruffled fin section.

Heat exchangers in the past have employed ruffled fin sections which are positioned between spaced plates to form channels or flow passages which provide for efficient heat transfer between the various units making up the sandwich-type structure normally employed in this type heat exchanger construction. However, these designs normally include a number of channels per flow passage which in the past consisted of a plurality of ruffled fin sections of proper width which are separated from the next adjacent fin section by a separate divider strip. Such construction required a great number of parts to fabricate each individual flow passage and a slight misalignment or cocking of the channel divider strips created natural traps for the brazing flux normally employed in securing the elements into a single unitary structure. Removal of this flux was difficult and was seldom completely assured with this type of structure.

It is therefore an object of this invention to provide an improved brazed plate and ruffled fin type heat exchanger in which the complete removal of brazing flux from within the individual flow passageways after the brazing operation is insured.

It is another object of this invention to provide an improved brazed plate and ruffled fin heat exchanger in which the flux normally remaining within the flow passages after the brazing operation may be more easily removed.

It is another object of this invention to provide an improved brazed plate and ruffled fin heat exchanger in which the number of parts making up the heat exchanger are greatly reduced, resulting in a unit which may be more easily assembled, requiring less total production time per unit exchanger.

It is another object of this invention to provide an improved brazed plate and ruffled fin heat exchanger in which the weight per unit is greatly reduced.

Further objects and advantages of this invention will become apparent as the following description proceeds and the features of novelty which characterize this invention will be pointed out with particularity in the claims annexed to and forming a part of this specification.

In accordance with one form of this invention, there is provided a brazed plate and ruffled fin heat exchanger which includes a continuous ruffled fin element positioned between spaced plates, the ruffled fin element being notched along the top and bottom to form areas between the plates which are free of the fins. A plurality of closure tabs are positioned along the top and bottom portions to completely seal the heat exchanger. The closure tabs include inwardly directed portions which extend within the extreme outer ends of the notched portions of the ruffled fin element so as to cooperate with the ruffled fin element to form a series of parallel channels within the heat exchanger.

For a better understanding of this invention reference may be had to the following detailed description accompanying drawings in which:

FIGURE 1 is a perspective view, partially in section, of a heat exchanger embodying one form of this invention;

FIGURE 2 is a front sectional view of one of the ruffled fin heat exchanger sections embodying one form of this invention;

FIGURE 3 is a top view partially in section of the heat exchanger section shown in FIGURE 2;

FIGURE 4 is a front view, partially in section, of a ruffled fin heat exchanger section which is normally found adjacent the section shown in FIGURES 2 and 3;

FIGURE 5 is a top view, partially in section, of the heat exchanger section shown in FIGURE 4;

FIGURE 6 is an end sectional view of the brazed plate and ruffled fin heat exchanger shown in FIGURE 1;

FIGURE 7 is a perspective view, partially in section, of a ruffled fin heat exchanger section showing in detail the placement of the closure tabs along the top of a heat exchanger section;

FIGURE 8 is a front view showing the construction of the closure tabs in another embodiment of this invention;

FIGURE 9 is a front view showing the construction of the closure tabs embodying another form of this invention;

FIGURE 10 is a front view, partially in section, of a ruffled fin heat exchanger section embodying still another form of this invention.

Referring now to the drawings, there is shown in FIGURE 1 a heat exchanger 10 of the brazed plate and ruffled fin type construction. The heat exchanger 10 is of the conventional "sandwich-type" construction and includes a series of generally parallel longitudinally extending ruffled finned sections 12 formed of a single sheet of metal which are spaced from each other by a series of flow-passage dividing plates 14. While the structure shown in the accompanying drawings is constructed of pure aluminum, the invention applies broadly to any brazed plate-ruffled fin type heat exchanger regardless of the material used and it is not intended that the invention be limited to the particular structure disclosed. The heat exchanger unit 10 includes alternate wide sections 16 and narrow sections 18, the narrow sections being joined by suitable headers 20 and 22 which may collect and distribute one of the fluids within the heat exchanger unit. For example, the narrow sections 18 may be employed to convey the fluid to be cooled which enters through inlet conduit 24 and is exhausted through outlet conduit 26. In this regard, the cooling fluid may enter the heat exchanger through individual conduits 28 and pass through the wide sections 16 to the header 30 where it is collected and returned through outlet conduit 32. While individual conduits 28 are shown for delivering one of the fluids, a single inlet header may be used which would be similar to the outlet header 30.

While the general structure shown in FIGURE 1 is conventional to heat exchangers of the brazed plate-ruffled fin type, the particular novel features of this invention are indicated in one embodiment shown in FIGURE 2, which is a front sectional view of one of the wide ruffled fin heat exchanger sections 14 of the heat exchanger 10. This heat exchanger section includes a continuous ruffled fin element 12 which extends across the heat exchanger and is formed of a single sheet of aluminum. The ruffled fin element terminates short of one end of the unit to form an inlet channel 42 which is directly connected to one of the inlet conduits 28 positioned at the top of the heat exchanger. This inlet channel 42 is not finned for either of the heat exchanger fluids and is designed to accept an evaporative coolant as used in a conventional system. Coolant in this channel is heated to an extent where it is partially evaporated and thereby accelerated as it passes downward through the first or inlet channel. At the outlet of the first channel 42 the coolant is turned through an abrupt 90° turn where a high degree of turbulence exists. The turbulent flow at this point indicated at 44 aids further distribution into the fins of the second channel 46.

The present invention is directed primarily toward a sandwich-type heat exchange structure in which the individual ruffled fin heat exchange sections include a ruffled finned element which extends completely through the heat exchanger so as to provide a unit which is lighter, includes fewer parts, and may be easily assembled, requiring less total time per unit than previous heat exchange structures. In addition, the structure in which the heat exchange sections are built up by brazing the single ruffled fin element between a pair of plates is such that any of the brazing flux normally remaining therein may be completely removed so as to prevent any later deterioration of the unit by the flux during normal operation. This end is greatly facilitated by the particular method employed in forming the "sandwich" structure prior to completely sealing the unit by the inclusion of top and bottom closure means.

Basically, the method employed in producing the structure shown in the accompanying drawings comprises two separate steps. The first step is the production of the sandwich-type structure wherein a series of wide and narrow ruffled fin elements are positioned between suitable plates and the whole unit is brazed to form a unitary structure. The particular method of brazing forms no part of the instant invention but two conventional arrangements may be employed, either dip brazing or furnace brazing. Dip brazing is where the whole unit is dipped in molten flux to raise the temperature of the alloy forming an outer layer on the aluminum plates to the melting point but not sufficient to melt the aluminum plate itself. After the unit has been immersed within the molten flux for a period of approximately ten minutes, the unit is raised above the bath and tilted to drain off the flux which normally adheres to the surface of the unit. It is necessary to completely clean out the flux after the brazing operation and particularly so where the unit is to be subjected to fluid flow such as in a heat exchanger structure. Conventional methods may be employed to insure that the brazing flux is removed such as immersing the heat exchange unit in boiling water before cooling from the brazing temperature which will remove the major portion of the flux. This may be followed by a dip in concentrated nitric acid for a period of time depending upon the design of the parts. The acid is then removed with a water rinse or other conventional means. Alternatively, the unit may be brazed within a suitable furnace in a conventional furnace brazing operation. Following furnace brazing the unit must be cleaned in a similar manner to that following dip brazing to remove all of the flux within the many passages formed within the heat exchanger.

The present invention allows complete removal of the flux by the provision of a single sheet ruffled fin element which extends completely through the length of each of the sections so that there are no hidden corners, crevices, or joints which would normally prevent flux removal. This structure is different from the previously known heat exchangers in which each heat exchanger section included a series of ruffled fin sections which were divided by divider strips to form individual channels. This required a large number of parts during the initial fabricating stage to form each individual flow passage and the inclusion of these strips resulted in trapping of some of the brazing flux. Failure to remove the brazing flux allows the flux to later chemically attack the materials forming the heat exchanger with resulting corrosion and ultimate failure of the unit. The present invention eliminates any possibility of the flux being trapped within the heat exchange sections since the heat exchange unit as removed from the brazing furnace or from the brazing dip bath includes only the single sheet ruffled fin elements which are brazed to the plates forming the individual heat exchange sections.

The second major step in the production of a heat exchanger embodying the present invention, is the enclosing of the top and bottom sections of the heat exchanger and the simultaneous forming of a plurality of channels through each section so as to produce a greatly elongated flow path of the fluids moving through the unit. In the embodiment shown in FIGURES 2 through 7, the individual channels are formed by means of a series of closure tabs 48 which are positioned in contacting relationship along the top and bottom of the section. To provide areas within the heat exchange sections so that the fluid flow within the channels may reverse itself, the single sheet ruffled fin element is notched or cut away both at selected areas of the top and bottom which results in spaces 50 being formed between the plates 14 which are free of any fins. To effect the desired reversal of flow and continued movement of the fluid throughout the ruffled fin element, the fin 12 is notched or cut away so that the extreme inner portion or valley 52 of the notched or cutout of the ruffled fin element at the top of the heat exchanger is aligned with the extreme outer tip portion or peak 54 at the bottom of the heat exchanger. Likewise, the extreme inner portion 52 of the notched ruffled fin element 12 at the bottom of the heat exchanger section is aligned with the extreme outer notched portion 54 at the top of the heat exchanger. To produce a multichannel heat exchanger section, each individual closure tab 48 includes an inwardly projecting portion 56 which extends within the ruffled fin element 12 at the extreme outer portion 54 of the notched ruffled fin element. The closure tab is bent at right angles in the vicinity of the peak portion of the ruffled fin element 12 and extends laterally across the fin-free area 50 towards the next adjacent outer tip portion 54. As indicated in FIGURES 2, 4, and 7, the closure tab 48 terminates in a generally outwardly directed rounded portion 58 which laps over the adjacent closure tab at the portion where the closure tab is bent at right angles and projects from the peak portion of the ruffled fin element 12. Thus, not only do the closure tabs in cooperation with the ruffled fin element form a plurality of channels within the heat exchanger section, but they also function to completely seal the top and bottom portions of the heat exchanger sections. This results in a compact structure, which includes a minimum number of parts, is relatively light, and is much more easily assembled. In the particular structure shown, the closure tab 48 is inserted approximately a fourth of an inch into the proper fin convolution to form the channel of correct design width. As indicated, the closure tabs are of varying lengths, the closure tab adjacent the inlet conduit 28 being the shortest and the closure tab adjacent the outlet header 30 being the longest. Thus, the channels are progressively greater in area as the fluid is directed away from the inlet conduit towards the outlet. The particular widths for each of the channels are determined by design performance requirements and as such may be of identical or varying lengths depending upon the performance desired.

After the individual closure tabs are positioned along the top and bottom of the heat exchange section, or if the unit is to contain a number of parallel sections, after all of the individual closure tabs have been positioned, they may be welded or soldered in place. As indicated in FIGURES 1 through 6, the closure tabs may be soldered in place by completely covering the tabs with a layer of solder. However, this arrangement may have some disadvantages in that a complete solder layer may add unnecessarily to the total weight of the unit, and where weight is important it may be necessary to solder each individual closure tab in place. Such an arrangement is shown in FIGURE 7 wherein a strip of solder 60 acts to seal all of the joints and in particular the joints formed by the overlapping of one end 58 of the closure tab 48 upon the next succeeding or adjacent closure tab.

As indicated in FIGURE 6, the heat exchanger unit shown in FIGURE 1 is made up of a series of wide and narrow ruffled fin sections which are separated by the plates 14. It can be readily seen that the present invention produces a heat exchange structure which insures that none of the brazing flux will remain within the unit subsequent to the brazing operation. After the brazing operation, and the removal of any residue flux, the individual closure tabs 48 are positioned in the manner indicated above, and the upper and bottom surface of the heat exchange unit may be soldered or welded in a conventional manner to secure the closure tabs to the unit.

FIGURE 8 shows an alternative embodiment in which the individual closure tabs 48 while having the same general configuration, do not include the generally rounded portion 58 as indicated in FIGURE 7 for overlapping the next succeeding or adjacent closure tab, but rather are cut short and abut the end of the next succeeding tab as indicated at 62. After all of the closure tabs have been positioned, they may be secured and sealed by means of a conventional soldering or welding process which will leave a strip of solder indicated at 60.

However, it may be desirable to effect a somewhat stronger joint by utilizing the embodiment shown in FIGURE 9 wherein the extreme end portion 64 of the closure tab 48 is not generally rounded as indicated at 58 in FIGURE 7 but does somewhat overlap the next succeeding closure tab 58 where it is welded or soldered in place similar to the arrangements of FIGURES 7 and 8. While any of the different embodiments shown in FIGURES 7, 8, and 9 may be used as desired, these alternative arrangements are included only to illustrate possible variations in the present invention and it is intended that the scope of the invention be by no means limited to the embodiments shown herein.

Another embodiment of the present invention is shown in FIGURE 10 wherein the heat exchanger section includes a single element ruffled fin 12 which is positioned between the plates 14 in a manner identical with the other embodiments discussed previously. In like manner, the single ruffled fin element is notched at both the top and bottom to provide spaces 50 within the heat exchange unit which are free of the fins. In this instance, a plurality of closure tabs 70 are provided which are generally T shaped and have their base portions 72 extending within the peak portions 54 of the single ruffled fin element 12 in a manner similar to the closure tabs 48 of the embodiment shown in FIGURES 1 through 9. The closure tab 70 includes laterally extending arm portions 74 which are positioned at right angles to the base portion 72. Unlike the other closure tabs, the arm portions of one closure tab do not abut or contact the arm portions of the next, succeeding or adjacent closure tab but are spaced therefrom. To completely enclose the top and bottom surfaces of the heat exchanger, there is provided a single plate element 76 at the top of the heat exchanger and a like plate 78 at the bottom of the heat exchanger which contacts the upper surface of the closure tabs 70. Thus, the single element cover plates 76 and 78 along with the T-shaped closure tabs 70, and the notched ruffled fin element 12 define a number of parallel channels in the heat exchange section of correct design width. The individual notched sections of the ruffled fin element may be spaced rather closely together or far apart to produce flow-directing channels of varying width in conformance to the desired design performance requirements.

There is further shown in the upper left-hand corner of the heat exchange section of FIGURE 10, a closure tab 80 which is generally L shaped and includes an arm having a length which is approximately equal to the length of its base. This L-shaped closure tab 80 is somewhat similar in configuration to the closure tabs 48 shown in FIGURES 2 through 9, with the exception that it does not abut or contact the next, succeeding or adjacent closure tab. It is only necessary that the closure tabs include a portion which extends within the ruffled fin element and a portion which makes contact with or forms a top or bottom surface so that the individual flow channels may be produced within the heat exchanger. Accordingly, while there is shown and described specific embodiments of this invention, it is not desired that the invention be limited to the particular construction shown and described and it is intended by the appended claims to cover all modifications within the spirit and scope of this invention.

What is claimed is:

1. A multi-channel multi-pass plate and ruffled fin heat exchanger section, comprising at least one continuous ruffled fin element, spaced plates sandwiching the fin element to define therebetween a series of generally parallel open ends of the channels to form separated spaces be- a series of complementary aligned, notched portions extending along the opposite edges thereof in line with the open ends of the channel to form separated spaces between said plates which are free of said fin element, and a plurality of joined closure members abutting the spaced plates in sealing relation therewith and extending across the peak portions of each notch operable to seal the space defined therein, said closure members each including a portion extending within and in sealed relation with the fin element proximate the peak portion to seal the adjacent spaces separate from each other whereby said closure members and said ruffled fin element define a continuous tortuous flow passage through the channels and the successive separated spaces.

2. A multi-channel multi-pass heat exchanger comprising at least one continuous ruffled fin element, spaced plates sandwiching said fin element to define a series of parallel open-ended channels, said ruffled fin element being notched along the opposite edges thereof aligned with the open ends of the channels to form spaces between said plates communicating with said channels, a plurality of closure members interconnecting said plates adjacent said edges, said closure members each including one portion extending slightly within the peak portions of said ruffled fin element and having another portion extending therefrom to an adjacent peak portion to completely seal the adjacent spaces from each other except through the communicating channels, whereby said closure members and said ruffled fin element form a continuous multi-pass flow passage within said heat exchanger.

3. A multi-channel multi-pass plate and ruffled fin heat exchanger, comprising at least one continuous ruffled fin element, spaced plates sandwiching the opposite sides of said fin element to define therewith a series of separate parallel open-ended channels terminating at opposite edges of the fin element, said opposite edges of the fin element defining complementary aligned peaks and valleys extending successively along the length thereof, closure members abutting the spaced plates adjacent the opposite edges of the fin element operable to seal the defined space therein, tabs projecting from the closure members and abutting the fin element proximate the peaks operable to separate from each other the adjacent valleys on similar edges of the fin element, and inlet and outlet means communicating with the channels at opposite ends of the fin element.

4. A multi-channel multi-pass plate and ruffled fin heat exchanger, comprising at least one continuous ruffled fin element, spaced plates sandwiching the opposite sides of said fin element to define therewith a series of separate parallel open-ended channels terminating at opposite edges of the fin element, said opposite edges defining complementary aligned peaks and valleys extending successively along the length of the fin element, closure members abutting the spaced plates adjacent the opposite edges of the fin element operable to seal the defined space therein, tabs projecting from the closure members in line with the channels and abutting the fin element proximate the peaks to separate from each other the adjacent valleys on similar edges of the fin element, and inlet and outlet means communicating with the channels at opposite ends of the fin element.

5. A multi-channel multi-pass plate and ruffled fin heat exchanger, comprising at least one continuous ruffled fin element, spaced plates sandwiching the opposite sides of said fin element to define therewith a series of separate parallel open-ended channels terminating at opposite edges of the fin element, said opposite edges defining complementary aligned peaks and valleys extending successively along the length of the fin element, closure members abutting the spaced plates adjacent the opposite edges of the fin element operable to seal the defined space therein, tabs projecting from the closure members in line with the channels and extending into the channels proximate the peaks in generally sealed relation therewith to separate the adjacent valleys from each other on similar edges of the fin element, and inlet and outlet means communicating with the channels at opposite ends of the fin element.

6. A multi-channel multi-pass plate and ruffled fin heat exchanger, comprising at least one continuous ruffled fin element, spaced plates sandwiching the opposite sides of said fin element to define therewith a series of separate parallel open-ended channels terminating at opposite edges of the fin element, said opposite edges defining complementary aligned peaks and valleys extending successively along the length of the fin element, closure members abutting the spaced plates adjacent the opposite edges of the fin element operable to seal the defined space therein, tabs in sealed relation with the closure members and projecting therefrom in line with the channels, said tabs extending into the channels proximate the peaks in generally sealed relation therewith to separate from each other the adjacent valleys on similar edges of the fin element, and inlet and outlet means communicating with the channels at opposite ends of the fin element.

References Cited in the file of this patent

UNITED STATES PATENTS

| | | |
|---|---|---|
| 2,154,217 | Savage | Apr. 11, 1939 |
| 2,614,517 | Peterson | Oct. 21, 1952 |
| 2,686,957 | Koerper | Aug. 24, 1954 |
| 2,782,010 | Simpelaar | Feb. 19, 1957 |
| 2,796,239 | Holmes et al. | June 18, 1957 |
| 2,830,798 | Andersen | Apr. 15, 1958 |
| 2,869,835 | Butt | Jan. 20, 1959 |

FOREIGN PATENTS

| | | |
|---|---|---|
| 112,102 | Germany | May 21, 1899 |
| 159,933 | Great Britain | Mar. 10, 1921 |

UNITED STATES PATENT OFFICE
CERTIFICATE OF CORRECTION

Patent No. 3,047,271                      July 31, 1962

Jack R. Burtt et al.

It is hereby certified that error appears in the above numbered patent requiring correction and that the said Letters Patent should read as corrected below.

Column 6, line 15, for "open ends of the channels to form separated spaces be-" read -- open-ended channels, said ruffled fin element including --.

Signed and sealed this 8th day of January 1963.

(SEAL)
Attest:

ERNEST W. SWIDER
Attesting Officer

DAVID L. LADD
Commissioner of Patents